US011459761B2

(12) United States Patent
Ackermann et al.

(10) Patent No.: US 11,459,761 B2
(45) Date of Patent: Oct. 4, 2022

(54) ROOFING MEMBRANE WITH A FUNCTIONAL LAYER

(71) Applicant: SIKA TECHNOLOGY AG, Baar (CH)

(72) Inventors: Herbert Ackermann, Tann (CH); Roman Da Rin, Emmen (CH); Roy Z'Rotz, Ebikon (CH); Robert Roskamp, Altdorf (CH); Carine Kerber, Sarnen (CH)

(73) Assignee: SIKA TECHNOLOGY AG, Baar (CH)

( * ) Notice: Subject to any disclaimer, the term of this patent is extended or adjusted under 35 U.S.C. 154(b) by 228 days.

(21) Appl. No.: 16/768,640

(22) PCT Filed: Nov. 29, 2018

(86) PCT No.: PCT/EP2018/083066
§ 371 (c)(1),
(2) Date: May 29, 2020

(87) PCT Pub. No.: WO2019/106117
PCT Pub. Date: Jun. 6, 2019

(65) Prior Publication Data
US 2021/0172174 A1  Jun. 10, 2021

(30) Foreign Application Priority Data

Nov. 29, 2017  (EP) ..................... 17204470

(51) Int. Cl.
*E04B 2/00* (2006.01)
*E04D 5/10* (2006.01)
(Continued)

(52) U.S. Cl.
CPC ............... *E04D 5/10* (2013.01); *B32B 5/028* (2013.01); *B32B 7/12* (2013.01); *B32B 27/12* (2013.01);
(Continued)

(58) Field of Classification Search
CPC ........ B32B 2419/06; B32B 5/028; E04D 5/10
See application file for complete search history.

(56) References Cited

U.S. PATENT DOCUMENTS

| 4,656,062 A | * | 4/1987 | Harriett | C09K 3/10 |
| | | | | 427/397.8 |
| 5,580,630 A | * | 12/1996 | Byrd | E04B 1/665 |
| | | | | 428/350 |
| 6,034,010 A | * | 3/2000 | Cartwright | D06M 11/50 |
| | | | | 442/400 |

(Continued)

FOREIGN PATENT DOCUMENTS

| CN | 107379684 A | 11/2017 |
| WO | 2017/108843 A1 | 6/2017 |

OTHER PUBLICATIONS

Database WPI; 2017; Week 201804; Thomson Scientific, London, GB; XP002780397.

(Continued)

*Primary Examiner* — Basil S Katcheves
(74) *Attorney, Agent, or Firm* — Oliff PLC

(57) ABSTRACT

A sealing device including a waterproofing layer, a functional layer, and a reinforcement layer fully embedded into the waterproofing layer or located between the waterproofing layer and the functional layer and/or a second waterproofing layer located on the outward facing side of the waterproofing layer opposite the side of the functional layer. Further, a method for producing a sealing device, to a method for waterproofing a substrate using one or more sealing devices, and to a roof system comprising a roof substrate and a sealing device directly adhered to the surface of the roof substrate with a layer of adhesive.

19 Claims, 2 Drawing Sheets

(51) Int. Cl.
*B32B 5/02* (2006.01)
*B32B 7/12* (2006.01)
*B32B 27/12* (2006.01)
*B32B 27/20* (2006.01)
*B32B 37/15* (2006.01)
*E04D 5/14* (2006.01)

(52) U.S. Cl.
CPC ............ *B32B 27/20* (2013.01); *B32B 37/153* (2013.01); *E04D 5/148* (2013.01); *B32B 2264/10* (2013.01); *B32B 2307/7265* (2013.01); *B32B 2419/06* (2013.01)

(56) References Cited

U.S. PATENT DOCUMENTS

| | | | | |
|---|---|---|---|---|
| 7,101,598 B2* | 9/2006 | Hubbard | ............... | E04D 13/16 428/141 |
| 7,430,837 B2* | 10/2008 | Hubbard | ............... | E04D 5/145 52/410 |
| 7,732,028 B2* | 6/2010 | Monk | .................... | B60K 15/03 220/900 |
| 2015/0086774 A1* | 3/2015 | Ackermann | ............. | B32B 5/02 156/60 |
| 2016/0340837 A1* | 11/2016 | Ackermann | ............ | E01C 7/353 |
| 2016/0340839 A1* | 11/2016 | Ackermann | ............ | E01C 7/325 |

OTHER PUBLICATIONS

Jan. 21, 2019 Search Report issued in International Search Report issued in International Patent Application No. PCT/EP2018/083066.

Jan. 21, 2019 Written Opinion of the International Searching Authority issued in International Seach Report issued in International Patent Application No. PCT/EP2018/083066.

* cited by examiner

ROOFING MEMBRANE WITH A FUNCTIONAL LAYER

TECHNICAL FIELD

The invention relates to the field of waterproofing of above ground building constructions by using sealing devices. In particular, the invention relates to sealing devices, which can be used for providing fully adhered roof systems.

BACKGROUND OF THE INVENTION

In the field of construction, polymeric sheets, which are often referred to as membranes or panels, are used for sealing flat and low-sloped roofs against penetration of water. The flat roof structures can be provided as single-ply or multi-ply systems. In single-ply systems, the roof substrate is covered using a roofing membrane composed of single waterproofing layer, which is typically reinforced with a reinforcement layer such as a scrim, mesh, or fabric layer. In multi-ply systems a roofing membranes composed of multiple layers of different or similar materials are used. The individual layers of a multi-ply roofing membrane can also be reinforced. A multi-ply roofing membrane composed or two or more non-reinforced waterproofing layers of same material also known as homogeneous roofing membranes. Single-ply roofing membranes have the advantage of lower production costs compared to the multi-ply membranes but they are also less resistant to mechanical damages cause by punctures of sharp objects.

Commonly used materials for roofing membranes include thermoplastics such as plasticized polyvinylchloride (p-PVC), thermoplastic olefins (TPE-O, TPO), and elastomers such as ethylene-propylene diene monomer (EPDM). Polymeric roofing membranes are typically delivered to a construction site in rolls, transferred to the place of installation, unrolled, and adhered on the surface of the roof substrate. The roof substrate on which the membrane is adhered may be comprised of variety of materials depending on the installation site. The roof substrate may be, for example, a concrete, metal, or wood deck, or it may include an insulation board or recover board and/or an existing membrane.

Roofing membranes must be securely fastened to the roof substrate to provide sufficient mechanical strength to resist the shearing forces applied on it due to high wind loads. Roof systems are typically divided into two categories depending on the means used for fastening the roofing membrane to the roof substrate. In a mechanically attached roof system, the membrane is fastened to the roof substrate using screws and/or barbed plates. Mechanical fastening enables high strength bonding but it provides direct attachment to the roof substrate only at locations where a mechanical fastener affixes the membrane to the surface, which makes mechanically attached membranes susceptible to flutter. In case of a fully-adhered roof system, the roofing membrane is typically adhered to the substrate by adhesive bonding.

Fully adhered roof systems can be prepared by using any kind of suitable adhesive(s). The selection of the suitable adhesive(s) depends on the compositions of the roofing membrane and roof substrate. Typically, roofing membranes are adhered by contact bonding or by using self-adhering roofing membranes. In case of contact bonding, both the membrane and the surface of the roof substrate are first coated with a solvent or water based contact adhesive after which the membrane is contacted with the surface of the substrate. The volatile components of the contact adhesive are "flashed off" to provide a partially dried adhesive film prior to contacting the membrane with the surface of the roof substrate. Self-adhering roofing membranes are provided with a pre-applied layer of adhesive, which is covered with a release liner to prevent premature unwanted adhesion and to protect the adhesive from moisture, fouling, and other environmental factors. At the time of use the release liner is removed and the membrane is secured to the roof substrate without the use of additional adhesives. Roofing membranes having a pre-applied adhesive layer covered by release liner are also known as "peel and stick membranes" or "self-adhering membranes".

In order to create a continuous waterproofing seal, the edges of adjacent roofing membranes are overlapped to form sealable joints. These joints can then be sealed by bonding the bottom surface of an overlapping edge to the top surface of another overlapping edge or by using sealing tapes bridging the gap between top surfaces of both overlapping edges. The technique for bonding the overlapping parts of the adjacent roofing membranes depends on the composition of the membranes. In case of membranes composed of thermoplastic or non-crosslinked elastomeric materials, the overlapping portions of adjacent membranes can be bonded to each other by heat-welding. In case of self-adhering membranes, an area near the lengthwise edges of the membrane is typically left free of adhesive in order to enable joining of the overlapping edges by heat-welding. The overlapping portions of the membranes can also be bonded to each other by using an adhesive, which can be same or different than the adhesive as used for bonding the membrane to the roof substrate.

The State-of-the-Art roofing membranes used for preparing fully adhered roof systems typically include a fiber-based barrier layer to ensure the long term compatibility of the polymeric waterproofing layer and the adhesive used for bonding the membrane to the substrate. The additional fiber-based barrier layer complicates the production process and increases the material costs of the roofing membrane.

There thus remains a need for a sealing device, which can be produced at lower cost than the State-of-the-Art roofing membranes and which can be used for providing fully adhered roof systems.

SUMMARY OF THE INVENTION

The object of the present invention is to provide a sealing device, which can be used for sealing above ground constructions, in particular roof substrates, against penetration of water.

Another object of the present invention is to provide a sealing device, which can be used for providing fully-adhered roof systems.

The subject of the present invention is a sealing device as defined in claim 1.

It was surprisingly found out that the fiber-based barrier layer of a State-of-the-Art roofing membrane can be replaced with a functional layer comprising at least one thermoplastic polymer and at least one solid particulate filler to ensure long term compatibility of the polymeric waterproofing layer and the adhesive used for adhering the roofing membrane to the roof substrate.

One of the advantages of the sealing device of the present invention is that it enables providing fully adhered roof systems with lower costs than State-of-the-Art sealing devices.

Other aspects of the present invention are presented in other independent claims. Preferred aspects of the invention are presented in the dependent claims.

DETAILED DESCRIPTION OF THE INVENTION

Figure 1:
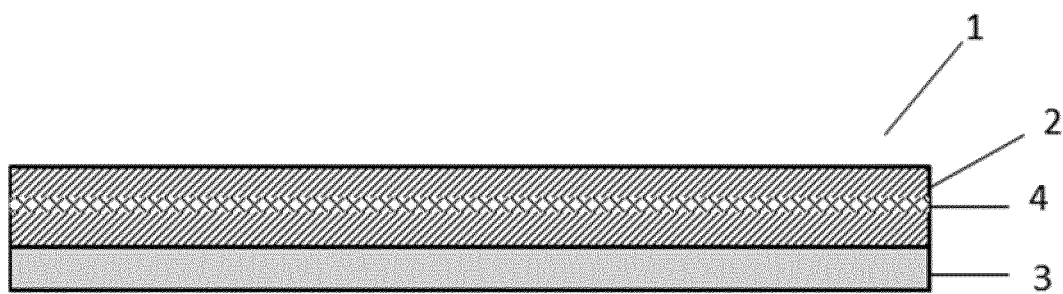
FIG. 1 shows a cross-section of a sealing device (1) comprising a waterproofing layer (2) having first and second major surfaces, a functional layer (3) having first and second major surfaces, and a reinforcement layer (4), which is fully embedded into the waterproofing layer (2).

The subject of the present invention is a sealing device comprising a waterproofing layer having first and second major surfaces and a functional layer having first and second major surfaces and comprising:

a) 10-70 wt.-% of at least one thermoplastic polymer P2 and b) 30-90 wt.-% of at least one solid particulate filler F, said proportions being based on the total weight of the functional layer, wherein the functional layer (3) and the waterproofing layer (2) are directly or indirectly connected over at least part of their opposing major surfaces and wherein the sealing device further comprises a reinforcement layer (4) fully embedded into the waterproofing layer (2) or located between the waterproofing layer (2) and the functional layer (3) and/or a second waterproofing layer (2') located on the outward facing side of the waterproofing layer (2) opposite the side of the functional layer (3).

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" designates a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "elastomer" refers to any natural, synthetic, or modified high molecular weight polymer or combination of polymers, which is capable of recovering from large deformations, i.e. has elastic properties. The elastomer can be, or already is, modified to a state in which it is essentially insoluble (but can swell) in a boiling solvent. The term "elastomer" may be used interchangeably with the term "rubber."

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight may be determined by gel permeation chromatography.

The term "glass transition temperature" refers to the temperature measured by DSC according to ISO 11357 standard above which temperature a polymer component becomes soft and pliable, and below which it becomes hard and glassy. The measurements can be performed with a Mettler Toledo 822e device at a heating rate of 2 degrees centigrade/min. The $T_g$ values can be determined from the measured DSC curve with the help of the DSC software.

The term "softening point" refers in the present document to a temperature at which compound softens in a rubber-like state, or a temperature at which the crystalline portion within the compound melts. The softening point can be measured by a ring and ball method according to DIN EN 1238.

The "amount or content of at least one component X" in a composition, for example "the amount of the at least one thermoplastic polymer P" refers to the sum of the individual amounts of all thermoplastic polymers P contained in the composition. For example, in case the composition comprises 20 wt.-% of at least one thermoplastic polymer P, the sum of the amounts of all thermoplastic polymers P contained in the composition equals 20 wt.-%.

The term "room temperature" designates a temperature of 23° C.

The waterproofing layer and functional layer are preferably planar elements having first and second major surfaces, i.e. top and bottom surfaces, defined by peripheral edges and defining a thickness there between. The term "planar element" refers in the present document to sheet-like elements having a length and width at least 50 times, preferably at least 100 times, more preferably at least 250 times, greater than the thickness of the element. The functional layer and the waterproofing layer are at directly or indirectly connected over at least part of their opposing major surfaces. It may, however, be preferable that substantially the entire area of the first major surface of the functional layer is directly or indirectly connected to the second major surface of the waterproofing layer. It may also be preferable that the functional layer and the waterproofing layer have substantially same width and length.

Preferably, the functional layer comprises a heterogeneous mixture of at least two discrete phases, in particular a continuous thermoplastic polymer phase and a discontinuous solid filler phase. The continuous thermoplastic polymer phase comprises the at least one thermoplastic polymer P2 and optionally one or more other polymer materials and/or additives that can be mixed or interspersed sufficiently with the at least one thermoplastic polymer P2 so as to essentially constitute a single "thermoplastic polymer phase". The thermoplastic polymer phase is characterized as generally being capable of forming a melt by heating to above a specified temperature and then re-solidifying when cooled sufficiently. Due to the presence of the thermoplastic phase, the functional layer is weldable with other layers comprising thermoplastic polymers, which are compatible with the at least one thermoplastic polymer P2.

The discontinuous solid filler phase comprises the at least one solid particulate filler F, which may be present in the functional layer as individual particles or as aggregates of one or more particles. These are at least partially, preferably completely, surrounded by the continuous thermoplastic phase, i.e. the solid particulate filler F is dispersed into the continuous thermoplastic polymer phase. In case the functional layer contains one or more mineral binders, such as cement, it is essential that these do not form interconnected solid networks of hydrated mineral binders. It may be preferable that the functional layer is essentially free, more preferably completely free, of interconnected solid networks of hydrated mineral binders. The particles of the at least one solid particulate filler F will not generally undergo a phase change by heating, at least not at temperatures at which the thermoplastic polymer phase forms a melt. Instead, the particles of the solid particulate filler F will remain as a discrete discontinuous solid phase interspersed among the continuous thermoplastic phase. The particles of the at least one solid particulate filler F may be dispersed throughout the matrix formed by the at least one thermoplastic polymer P2.

Preferably, the particles of the at least one solid particulate filler F are distributed throughout the entire volume of the functional layer. The term "distributed throughout the entire volume" in understood to mean that the at least one solid filler F is present in essentially all portions of the functional layer but it does not necessarily imply that the distribution is uniform throughout the functional layer. It may, however, be preferable that the at least one solid particulate filler F is uniformly distributed throughout the entire volume of the functional layer. For a person skilled in the art it is clear that even if the at least one solid particulate filler F is "uniformly distributed", there may be regions in the functional layer, which have a slightly higher concentration of the at least one solid particulate filler F than other regions and that a 100% uniform distribution is generally not achievable.

Preferably, the waterproofing layer is a thermoplastic waterproofing membrane. The detailed composition of the waterproofing layer is not particularly restricted but should be as waterproof as possible and not to decompose or be mechanically damaged even under prolonged influence of water or moisture. Preferably, the waterproofing layer comprises at least one thermoplastic polymer P1, which is present in the waterproofing layer in an amount of at least 80 wt.-%, more at least 85 wt.-%, even more preferably at least 90 wt.-%, most preferably at least 95 wt.-%, based on the total weight of the waterproofing layer.

Suitable thermoplastic polymers P1 include ethylene-vinyl acetate copolymer (EVA), ethylene-acrylic ester copolymers, ethylene-α-olefin co-polymers, ethylene-propylene co-polymers, propylene-α-olefin co-polymers, propylene-ethylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB). According to one or more embodiments, the at least one thermoplastic polymer P1 is selected from the group consisting of low-density polyethylene, linear low-density polyethylene, high-density polyethylene, ethylene-vinyl acetate copolymer (EVA), ethylene-acrylic ester copolymers, ethylene-α-olefin co-polymers, and ethylene-propylene co-polymers. According to one or more embodiments, the at least one thermoplastic polymer P1 is selected from the group consisting of propylene-α-olefin co-polymers, propylene-ethylene copolymers, and polypropylene.

Preferably, the at least one thermoplastic polymer P1 is miscible with the at least one thermoplastic polymer P2 contained in the functional layer. More preferably, the at least one thermoplastic polymer P1 is weldable with the at least one thermoplastic polymer P2. The polymers being "weldable" with each other means here that a thermoplastic layer consisting of the at least one thermoplastic polymer P1 can be homogenously joined by heat welding with another thermoplastic layer consisting of the at least one thermoplastic polymer P2. According to one or more embodiments, the at least one thermoplastic polymer P1 and the at least one thermoplastic polymer P2 are identical.

The sealing device further comprises a reinforcement layer and/or a second waterproofing layer, which are intended to improve the dimensional stability of the sealing device. The reinforcement layer, if used, is preferably present in a form of a reinforcing scrim or a reinforcing fiber material.

Any kind of reinforcing scrims typically used for improving the dimensional stability of the thermoplastic waterproofing membranes can be used. Typically such reinforcing scrims comprise a mesh of interwoven strands, which comprise or are composed of plastic or metal material. Suitable reinforcing scrims have a tensile strength sufficient to resist tearing when exposed to typical tensile loads experienced by roofing membranes from various directions. Particularly suitable materials for the reinforcing scrim layer include, for example, polypropylene, polyethylene terephthalate (PET), and polyester.

The term "fiber material" refers in the present document to materials composed of fibers. The fibers can comprise or consist of organic or synthetic material. These include, in particular, cellulose fibers, cotton fibers, protein fibers, synthetic organic fibers, and synthetic inorganic fibers. Suitable synthetic fibers include fibers made of polyester, a homopolymer or copolymer of ethylene and/or propylene, viscose, nylon, and glass. The fibers can be short fibers or long fibers, spun, woven or unwoven fibers or filaments. The fibers can moreover be aligned or drawn fibers. Moreover, it may be advantageous to use different fibers, both in terms of geometry and composition, together. The reinforcing fiber material can be in the form of a fiber mat, a nonwoven fabric, or a fibrous tissue. Particularly suitable materials for the reinforcing fiber material include glass fibers, polyester fibers, and nylon fibers.

According to one or more embodiments, the sealing device comprises a reinforcement layer, which is fully embedded into the waterproofing layer. By the expression "fully embedded" is meant that the reinforcement layer is substantially fully covered by the matrix of the waterproofing layer. In these embodiments, the waterproofing layer and the functional layer are preferably directly connected to each other over at least part of their opposing major surfaces. The expression "directly connected" is understood to mean in the context of the present invention that no further layer or substance is present between the layers, and that the opposing surfaces of the two layers are directly bonded to each other or adhere to each other. At the transition area between the two layers the materials forming the layers can also be present mixed with each other. It may also be preferable that substantially the entire first major surface of the functional layer is directly connected to the second major surface of the waterproofing layer. It may for example be preferable that at least 90%, more preferably at least 95%, of the first major surface of the functional layer is directly connected to the second major surface of the waterproofing layer.

According to one or more embodiments, the sealing device comprises a reinforcement layer, which is located between the waterproofing layer and the functional layer. In these embodiments, one side of the reinforcement layer is preferably directly connected to the second surface of the waterproofing layer the other side being directly connected to the first surface of the functional layer. It is also possible that the reinforcement layer is partially embedded into the waterproofing layer and/or into the functional layer. According to one or more further embodiments, the sealing device comprises a first reinforcement layer, which is fully embedded into the waterproofing layer, and a second reinforcement layer, which is located between the waterproofing layer and the functional layer.

According to one or more embodiments, the sealing device comprises a second waterproofing layer having a first and second major surfaces and being located on the outward facing side of the waterproofing layer opposite to the side of the functional layer. The waterproofing layer and the second waterproofing layer are preferably directly or indirectly connected to each other over at least part of their opposing major surfaces. The second waterproofing layer may, for example, be bonded to the first major surface of the waterproofing layer by using adhesive means or by using thermal lamination/welding means. In these embodiments, the waterproofing layer and the functional layer are preferably directly connected to each other over at least part of their opposing major surfaces. It may also be preferable that substantially the entire first major surface of the functional layer is directly connected to the second major surface of the waterproofing layer. It may for example be preferable that at least 90%, more preferably at least 95%, of the first major surface of the functional layer is directly connected to the second major surface of the waterproofing layer.

According to one or more further embodiments, the sealing device comprises a reinforcement layer, which is fully embedded into the waterproofing layer and a second waterproofing layer having a first and second major surfaces and being located on the outward facing side of the waterproofing layer opposite to the side of the functional layer.

Preferably, the second waterproofing layer is also a thermoplastic waterproofing membrane. The detailed composition of the second waterproofing layer is not particularly restricted but should be as waterproof as possible and not to decompose or be mechanically damaged even under prolonged influence of water or moisture. Preferably, the second waterproofing layer comprises at least one thermoplastic polymer P3, which is present in the second waterproofing layer in an amount of at least 80 wt.-%, preferably at least 85 wt.-%, more preferably at least 90 wt.-%, most preferably at least 95 wt.-%, based on the total weight of the second waterproofing layer.

It can also be advantageous that the sealing device further comprises a top-coating applied to the outer surface of the sealing device facing away from the second major surface of the waterproofing layer, i.e. on the first major surface of the waterproofing layer or on the first major surface of the second waterproofing layer, if applicable. The top-coating may comprise UV-absorbers and/or thermal stabilizers to protect the sealing device from damaging influence of sunlight. The top-coating may also comprise color pigments in order to provide the sealing device with a desired color.

The functional layer comprises 10-70 wt.-%, preferably 20-60 wt.-%, more preferably 30-55 wt.-%, most preferably 35-50 wt.-%, based on the total weight of the functional layer, of at least one thermoplastic polymer P2.

Suitable thermoplastic polymers P2 include ethylene-vinyl acetate copolymer (EVA), ethylene-acrylic ester copolymers, ethylene-α-olefin co-polymers, ethylene-propylene co-polymers, propylene-α-olefin co-polymers, propylene-ethylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (FIB). According to one or more embodiments, the at least one thermoplastic polymer P2 is selected from the group consisting of low-density polyethylene, linear low-density polyethylene, high-density polyethylene, ethylene-vinyl acetate copolymer (EVA), ethylene-acrylic ester copolymers, ethylene-α-olefin co-polymers, and ethylene-propylene co-polymers. According to one or more embodiments, the at least one thermoplastic polymer P2 is selected from the group consisting of propylene-α-olefin co-polymers, propylene-ethylene copolymers, and polypropylene.

The functional layer also comprises 30-90 wt.-%, preferably 40-80 wt.-%, more preferably 45-70 wt.-%, most preferably 50-65 wt.-%, based on the total weight of the functional layer, of at least one solid particulate filler F. Preferably, the at least one solid particulate filler F is selected from the group consisting of inert mineral fillers and mineral binders.

The term "inert mineral filler" designates mineral fillers, which, unlike mineral binders are not reactive with water, i.e. do not undergo a hydration reaction in the presence of water. Suitable inert mineral fillers to be used in the functional layer include sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The term "sand" refers in the present document to mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%. The term "calcium carbonate" as inert mineral filler refers in the present document to calcitic fillers produced from chalk, limestone or marble by grinding and/or precipitation.

According to one or more embodiments, the at least one solid particulate filler F is an inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

According to one or more embodiments, the functional layer comprises 10-80 wt.-%, preferably 25-75 wt.-%, more preferably 30-70 wt.-%, most preferably 35-65 wt.-%, based on the total weight of the functional layer, of at least one inert mineral filler, preferably selected from the group consisting of comminuted concrete, calcium carbonate, diatomaceous earth, pumice, mica, kaolin, talc, dolomite, xonotlite, perlite, vermiculite, Wollastonite, barite, magnesium carbonate.

The term "mineral binder" refers in the present document to a binder, which in the presence of water reacts in a hydration reaction under formation of solid hydrates or hydrate phases. In particular, the term "mineral binder" refers in the present document to non-hydrated mineral binders, i.e. mineral binders, which have not been mixed with water and reacted in a hydration reaction. Suitable mineral binders to be used in the functional layer include hydraulic, non-hydraulic, latent hydraulic, and pozzolanic binders.

According to one or more embodiments, the at least one solid particulate filler F is a mineral binder selected from the group consisting of hydraulic, non-hydraulic, latent hydraulic, and pozzolanic binders.

The term "hydraulic binder" designates in the present document substances that harden as a result of chemical reactions with water ("hydration reactions") and produce hydrates that are not water-soluble. In particular, the hydration reactions of the hydraulic binder take essentially place independently of the water content. This means that hydraulic binders can harden and retain their strength even when exposed to water, for example underwater or under high humidity conditions. Examples of hydraulic binders include cement, cement clinker and hydraulic lime. In contrast, "non-hydraulic binders" such as air-slaked lime (non-hydraulic lime) and gypsum, are at least partially water soluble and must be kept dry in order to retain their strength. The term "gypsum" designates in the present document any known form of gypsum, in particular calcium sulfate dehydrate, calcium sulfate α-hemihydrate, calcium sulfate ß-hemihydrate, or calcium sulfate anhydrite or mixtures thereof.

The term "latent hydraulic binder" designates in the present document particular type II concrete additives with latent hydraulic character according to DIN EN 206-1:2000. These materials are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases. Examples of latent hydraulic binders include granulated blast furnace slag.

The term "pozzolanic binders" designates in the present document in particular type II concrete additives with pozzolanic character according to DIN EN 206-1:2000. These materials are siliceous or aluminosilicate compounds that react with water and calcium hydroxide to form calcium silicate hydrate or calcium aluminosilicate hydrate phases. Pozzolanic binders include natural pozzolans such as trass and artificial pozzolans such as fly ash and silica fume.

According to one or more embodiments, the functional layer comprises 10-80 wt.-%, preferably 25-75 wt.-%, more preferably 30-70 wt.-%, most preferably 35-65 wt.-%, based on the total weight of the functional layer, of cement or cement clinker. The cement can be any conventional cement, for example, one in accordance with the five main cement types according to DIN EN 197-1: namely, Portland cement (CEM I), Portland composite cements (CEM II), blast-furnace cement (CEM III), pozzolan cement (CEM IV) and composite cement (CEM V). These main cement types are subdivided, depending on the amount added, into an additional 27 cement types, which are known to the person skilled in the art and listed in DIN EN 197-1. Naturally, all other cements that are produced according to another standard are also suitable, for example, according to ASTM standard or Indian standard. To the extent that reference is made here to cement types according to DIN standard, this naturally also relates to the corresponding cement compositions which are produced according to another cement standard.

According to one or more embodiments, the functional layer comprises 1-60 wt.-%, preferably 2.5-55 wt.-%, more preferably 5-50 wt.-%, most preferably 10-40 wt.-%, of at least one inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites, and 1-60 wt.-%, preferably 2.5-55 wt.-%, more preferably 5-50 wt.-%, most preferably 10-40 wt.-%, of at least one mineral binder selected from the group consisting of hydraulic, non-hydraulic, latent hydraulic, and pozzolanic binders, in particular cement and cement clinker, all proportions being based on the total weight of the functional layer.

According to one or more embodiments, the functional layer comprises 1-60 wt.-%, preferably 2.5-55 wt.-%, more preferably 5-50 wt.-%, most preferably 10-40 wt.-%, of comminuted concrete and 1-60 wt.-%, preferably 2.5-55 wt.-%, more preferably 5-50 wt.-%, most preferably 10-40 wt.-%, of at least one other inert mineral filler and/or at least one mineral binder selected from the group consisting of hydraulic, non-hydraulic, latent hydraulic, and pozzolanic binders, in particular cement and cement clinker, all proportions being based on the total weight of the functional layer.

It has been found that the mineral binders, if present in the functional layer remain in a substantially non-hydrated state even if the sealing device is stored for several weeks at normal room temperature and relative humidity of 50%. However, even if the functional layer contains hydrated mineral binders, for example, in case the at least one solid particulate filler contains or consists of comminuted concrete, it is essential that the hydrated mineral binders do not form interconnected solid networks. The presence of solid networks of hydrated mineral binders in the functional layer would significantly reduce the flexibility of the sealing device, which is not desired in waterproofing and roofing applications.

Preferably, the median particle size $d_{50}$ of the at least one solid particulate filler F is 1-300 μm, more preferably 1-250 μm, even more preferably 2-200 μm, most preferably 2-150 μm. The term "median particle size $d_{50}$" refers in the present document to a particle size below which 50% of all particles by volume are smaller than the $d_{50}$ value. The term "particle size" refers to the area-equivalent spherical diameter of a particle. The particle size distribution can be measured by laser diffraction according to the method as described in standard ISO 13320:2009. For determination of the particle size distribution, the particles are suspended in water (wet dispersion method). A Mastersizer 2000 device (trademark of Malvern Instruments Ltd, GB) can be used in measuring particle size distribution.

Preferably, the overall particle size of the solid particulate filler F (of at least 98% of the particles) is below 250 μm, more preferably below 200 μm, even more preferably below 100 μm. It may also be preferable that less than 40 wt.-%, more preferably less than 30 wt.-%, even more preferably less than 20-wt.-%, most preferably less than 10 wt.-% of the particles of the at least one solid particulate filler F have a particle size of less than 5μm and/or that less than 40 wt.-%, more preferably less than 30 wt.-%, even more preferably less than 20-wt.-%, most preferably less than 10 wt.-% of the particles of the at least one solid particulate filler F have a particle size of above 100 μm.

The functional layer may further comprise one or more surfactants. The term "surfactant" refers in the present document to surface tension lowering substances, which are usually organic compounds containing both hydrophobic and hydrophilic groups. Based on the charge of the hydrophilic group the surfactants are typically classified to anionic, cationic, amphoteric, non-ionic surfactants.

According to one or more embodiments, the functional layer further comprises at least one surfactant SF selected from the group consisting of anionic, cationic, amphoteric, non-ionic, and polymeric surfactants.

Examples of suitable anionic surfactants include surfactants containing carboxylate, sulfate, phosphate or sulfonate groups, such as amino acid derivatives; fatty alcohol ether sulfates; fatty alcohol sulfates; soaps; alkylphenol ethoxylates; fatty alcohol ethoxylates; alkanesulfonates; olefinsulfonates; and alkyl phosphates.

Examples of suitable cationic surfactants include quaternary ammonium or phosphonium compounds, such as, for example, tetraalkylammonium salts; N,N-dialkylimidazoline compounds; dimethyldistearylammonium compounds, N-alkylpyridine compounds; and ammonium chlorides.

Amphoteric (zwitterionic) surfactants have both cationic and anionic centers attached to the same molecule. Examples of suitable amphoteric surfactants include amphoteric electrolytes such as aminocarboxylic acis and betaines.

Examples of suitable non-ionic surfactants include ethoxylates, such as, for example, ethoxylated adducts of alcohols, such as polyoxyalkylene polyols; amines; fatty acids; fatty acid amides; alkylphenols; ethanolamides; fatty amines; polysiloxanes; fatty acid esters; alkyl or alkylphenyl polyglycol ethers, such as, for example, fatty alcohol polyglycol ethers; alkylglycosides; sugar esters; sorbitan esters; polysorbates or trialkylamine oxides; esters and amides of poly(meth)acrylic acids with polyalkylene glycols or aminopolyalkylene glycols, which at most may be tacked at one end with alkyl groups.

Polymeric surfactants can be divided into two groups of compounds. The first group includes comb or rake polymers where there is an organic polymeric chain with hydrophobic groups at regular intervals along the chain and hydrophilic groups at random or regular intervals along that chain. The second group of polymeric surfactants includes block co-polymers where there are blocks of hydrophobic groups (B) and blocks of hydrophilic groups (A) usually in A-B-A configuration. Certain polymeric surfactants such as ethylene oxide-propylene oxide co-polymer surfactants can also be classified as non-ionic surfactants.

According to one or more embodiments, the at least one surfactant SF is present in the functional layer in an amount of at least 0.05 wt.-%, based on the total weight of the functional layer. It may be advantageous that the at least one surfactant SF is present in the functional layer in an amount of 0.05-5.0 wt.-%, preferably 0.1-4.0 wt.-%, more preferably 0.1-3.0 wt.-%, most preferably 0.25-2.0 wt.-%, based on the total weight of the functional layer.

Preferably, the at least one surfactant SF is selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates.

Examples of suitable commercially available glycerol monostearates include Dimodan HP (from Danisco).

Examples of suitable polycarboxylate ethers include polycarboxylate ether-based superplasticizers (PCEs), which are composed by a methoxy-polyethylene glycol copolymer (side chain) grafted with methacrylic acid copolymer (main chain). Suitable commercially available polycarboxylate ether-based superplasticizers include Viscocrete® Polymer PC-2, Viscocrete® Polymer RMC-2, and Cemerol® R-750 MC (from Sika).

Examples of suitable polyether-modified polysiloxanes include polyetherpolysiloxane copolymers. Suitable commercially available polyether-modified polysiloxanes include Tegostab B8870 (from Evonik).

Examples of suitable commercially available polyalkylene oxide siloxanes include Niax L-1500 (from Momentive).

Examples of suitable hydroxyethyl amines include bis(2-hydroxyethyl) amines, which are commercially available as Armostat 300 (from Akzo Nobel).

Examples of suitable commercially available erucamides and stearyl stearamides include Kemamide E180 and Kemamide80 (from PMC Biogenix). Examples of suitable alkali metal alkanesulfonates include sodium alkanesulfonates, which are commercially available as Armostat 3002 (from Akzo Nobel) and Loxiol 93P (from Emery Oleochemicals).

Examples of suitable commercially available alkylarylsulfonates include ZetaSphere 2300, 3100 and 3700 (from Airproducts).

According to one or more embodiments, the functional layer comprises at least one surfactant SF selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates, wherein the at least one surfactant SF is present in the functional layer in an amount of 0.05-5.0 wt.-%, preferably 0.1-4.0 wt.-%, more preferably 0.1-3.0 wt.-%, most preferably 0.25-2.0 wt.-%, based on the total weight of the functional layer.

The thickness of the functional layer is not particularly restricted and it may not be constant in the longitudinal and/or transverse direction of the sealing device. Preferably, the functional layer has a maximum thickness, determined by using the measurement method as defined in DIN EN 1849-2 standard, of 0.1-5.0 mm, preferably 0.1-2.5 mm, even more preferably 0.2-2.0 mm, most preferably 0.3-1.5 mm. It may also be preferable that the functional layer has a minimum thickness, determined by using the measurement method as defined in DIN EN 1849-2 standard, of 0.05-5.0 mm, preferably 0.05-2.5 mm, even more preferably 0.1-2.0 mm, most preferably 0.15-1.5 mm. Furthermore, it may be advantageous that the functional layer has an average thickness, calculated as arithmetic average of the maximum and minimum thicknesses, determined by using the measurement method as defined in DIN EN 1849-2 standard, of 0.075-5.0 mm, preferably 0.1-2.5 mm, even more preferably 0.2-2.0 mm, most preferably 0.3-1.5 mm.

The thickness of the waterproofing layer is not particularly restricted. The waterproofing layer may have a thickness, determined by using the measurement method as defined in DIN EN 1849-2 standard, of 0.2-5.0 mm, such as 0.4-2.5 mm, preferably 0.5-2.0 mm, more preferably 0.5-1.5 mm.

According to one or more embodiments, the sealing device further comprises a layer of adhesive composition coated on and at least partially covering the second major surface of the functional layer. The expression "coated on the second major surface of the functional layer" is understood to mean that the adhesive composition has been applied directly on the second major surface of the functional layer, i.e. the layer of adhesive composition and the functional layer are directly connected to each other over their opposing surfaces. Sealing devices according to these embodiments are also known as "self-adhering" membranes due to the presence of the pre-applied layer of adhesive. The adhesive composition may be coated to cover a portion or the entire area of the second major surface of the functional layer. It may, however, be preferable that at least 50%, more preferably at least 70%, most preferably at least 80%, of the area of the second major surface of the functional layer is covered by the layer of adhesive composition. In case the adhesive composition is used for bonding the overlapping portions of adjacent sealing devices, the layer of adhesive composition preferably covers substantially entire area, such as at least 90%, preferably at least 95%, of the second major surface of the functional layer. It may also be preferable, for example, due to production technical reasons, that narrow segments limited by the longitudinal edges of the functional layer and having a width of 1-2 mm are left free of the layer of adhesive composition.

Preferably, the functional layer is coated with a continuous layer of the adhesive composition. The term "continuous layer" refers in the present document to layers consisting of one single area coated with the adhesive composition. In contrast, a "discontinuous layer" is considered to consist of several isolated areas coated with the adhesive composition.

Preferred thickness of the layer of adhesive composition depends on the type of the adhesive. It may be preferable that the adhesive composition is applied on the second major surface of the functional layer to have a coating weight of 50-600 g/m$^2$, preferably 75-400 g/m$^2$, more preferably 100-400 g/m$^2$, most preferably 125-200 g/m$^2$.

The outer surface of the layer of adhesive composition facing away from the second major surface of the functional layer may at least partially, preferably completely, be covered with a release liner to prevent premature unwanted adhesion and to protect the layer of adhesive composition from moisture, fouling, and other environmental factors. In case the sealing device is provided in form of rolls, the release liner enables ease of unwind without sticking of the adhesive to the back side of the sealing device. The release liner may also be sliced into multiple sections to allow portioned detachment of the liner from the layer of adhesive composition.

Suitable materials for the release liner include Kraft paper, polyethylene coated paper, silicone coated paper as well as polymeric films, for example, polyethylene, polypropylene, and polyester films coated with polymeric release agents selected from silicone, silicone urea, urethanes, waxes, and long chain alkyl acrylate release agents.

The type of the adhesive composition is not particularly restricted. Any kind of adhesive suitable for preparing self-adhering roofing or waterproofing membranes can be used. Preferably, the adhesive composition is a pressure sensitive adhesive (PSA) composition, in particular a hot-melt pressure sensitive adhesive (HM-PSA) composition. The term "pressure sensitive adhesive" designates in the present disclosure viscoelastic adhesive materials, which adhere instantaneously to most substrates with the application of slight pressure and remain permanently tacky. The term "hot-melt pressure sensitive adhesive (HM-PSA)" designates in the present disclosure a class of pressure sensitive adhesives, which are applied as a hot-melt adhesive. In the following paragraphs the term "pressure sensitive adhesive" is used to refer to both pressure sensitive adhesives and hot-melt pressure sensitive adhesives.

Suitable pressure sensitive adhesives include compositions based on acrylic polymers, styrene block copolymers, amorphous poly-α-olefins (APAO), vinyl ether polymers, elastomers such as, for example, butyl rubber, ethylene vinyl acetate, natural rubber, nitrile rubber, silicone rubber, and ethylene-propylene-diene rubber. In addition to the above mentioned polymers, suitable pressure sensitive adhesive compositions typically comprise one or more additional constituents including, for example, tackifying resins, waxes, and plasticizers as wells as one or more additives such as, for example, UV-light absorption agents, UV- and heat stabilizers, optical brighteners, pigments, dyes, and desiccants.

According to one or more embodiments, the adhesive composition is a styrene block copolymer based pressure sensitive adhesive composition containing at least one styrene block copolymer. Suitable styrene block copolymers include block copolymers of the SXS type, in each of which S denotes a non-elastomer styrene (or polystyrene) block and X denotes an elastomeric α-olefin block, which may be polybutadiene, polyisoprene, polyisoprene-polybutadiene, completely or partially hydrogenated polyisoprene (poly ethylene-propylene), completely or partially hydrogenated polybutadiene (poly ethylene-butylene). The elastomeric α-olefin block preferably has a glass transition temperature in the range from −55° C. to −35° C. The elastomeric α-olefin block may also be a chemically modified α-olefin block. Particularly suitable chemically modified α-olefin blocks include, for example, maleic acid-grafted α-olefin blocks and particularly maleic acid-grafted ethylene-butylene blocks.

Preferably, the at least one styrene block copolymer is selected from the group consisting of SBS, SIS, SIBS, SEBS, and SEPS block copolymers. These can have a linear, radial, diblock, triblock or star structure, linear structure being preferred. Suitable styrene block copolymers of the SXS type include block copolymers based on saturated or unsaturated middle blocks X. Hydrogenated styrene block copolymers are also suitable. Preferably, the at least one styrene block copolymer is present in the styrene block copolymer based pressure sensitive adhesive composition in an amount of 5-60 wt.-%, more preferably 10-55 wt.-%, most preferably 20-50 wt.-%, based on the total weight of the adhesive composition.

Preferably, the styrene block copolymer based pressure sensitive adhesive composition comprises at least one tackifying resin. The term "tackifying resin" refers in the present document to resins that in general enhance the adhesion and/or tackiness of an adhesive composition. The term "tackiness" refers in the present document to the property of a substance of being sticky or adhesive by simple contact. The tackiness can be measured, for example, as a loop tack. Preferred tackifying resins are tackifying at a temperature of 25° C. Suitable tackifying resins to be used in the pressure sensitive adhesive composition include synthetic resins, natural resins, and chemically modified natural resins. According to one or more embodiments, the at least one tackifying resin is present in the styrene block copolymer based pressure sensitive adhesive composition in an amount of 5-60 wt.-%, preferably 10-55 wt.-%, most preferably 20-50 wt.-%, based on the total weight of the adhesive composition.

Examples of suitable natural resins and chemically modified natural resins include rosins, rosin esters, phenolic modified rosin esters, and terpene resins. The term "rosin" is to be understood to include gum rosin, wood rosin, tall oil rosin, distilled rosin, and modified rosins, for example dimerized, hydrogenated, maleated and/or polymerized versions of any of these rosins.

Suitable terpene resins include copolymers and terpolymers of natural terpenes, such as styrene/terpene and alpha methyl styrene/terpene resins; polyterpene resins obtainable from the polymerization of terpene hydrocarbons, such as the bicyclic monoterpene known as pinene, in the presence of Friedel-Crafts catalysts at moderately low temperatures; hydrogenated polyterpene resins; and phenolic modified terpene resins including hydrogenated derivatives thereof.

The term "synthetic resin" refers in the present document to compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, or mixtures thereof. Aliphatic monomers can include $C_4$, $C_5$, and $C_6$ paraffins, olefins, and conjugated diolefins. Examples of aliphatic monomers or cycloaliphatic monomers include butadiene, isobutylene, 1,3-pentadiene, 1,4-pentadiene, cyclopentane, 1-pentene, 2-pentene, 2- methyl-1-pentene, 2-methyl-2-butene, 2-methyl-2-pentene, isoprene, cyclohexane, 1- 3-hexadiene, 1-4-hexadiene, cyclopentadiene, and dicyclopentadiene. Aromatic monomers can include $C_8$, $C_9$, and $C_{10}$ aromatic monomer, such as styrene, indene, derivatives of styrene, derivatives of indene, coumarone and combinations thereof.

In particular, suitable synthetic resins include synthetic hydrocarbon resins made by polymerizing mixtures of unsaturated monomers that are obtained as by-products of cracking of natural gas liquids, gas oil, or petroleum naphthas. Synthetic hydrocarbon resins obtained from petroleum based feedstocks are referred in the present document as "petroleum hydrocarbon resins". These include also pure monomer aromatic resins, which are made by polymerizing aromatic monomer feedstocks that have been purified to eliminate color causing contaminants and to precisely control the composition of the product. Petroleum hydrocarbon resins typically have a relatively low average molecular weight ($M_n$), such in the range of 250-5'000 g/mol and a glass transition temperature of above 0° C., preferably equal to or higher than 15° C., more preferably equal to or higher than 30° C.

Preferably, the at least one tackifying resin is selected from the group consisting of C5 aliphatic petroleum hydrocarbon resins, mixed C5/C9 aliphatic/aromatic petroleum hydrocarbon resins, aromatic modified C5 aliphatic petroleum hydrocarbon resins, cycloaliphatic petroleum hydrocarbon resins, mixed C5 aliphatic/cycloaliphatic petroleum hydrocarbon resins, mixed C9 aromatic/cycloaliphatic petroleum hydrocarbon resins, mixed C5 aliphatic/cycloaliphatic/C9 aromatic petroleum hydrocarbon resins, aromatic modified cycloaliphatic petroleum hydrocarbon resins, and C9 aromatic petroleum hydrocarbon resins as well hydrogenated versions of the aforementioned resins.

The notations "C5" and "C9" indicate that the monomers from which the resins are made are predominantly hydrocarbons having 4-6 and 8-10 carbon atoms, respectively. The term "hydrogenated" includes fully, substantially and at least partially hydrogenated resins. Partially hydrogenated resins may have a hydrogenation level, for example, of 50%, 70%, or 90%.

Suitable plasticizers to be used in the styrene block copolymer based pressure sensitive adhesive composition include process oils, plasticizers on the basis of adipic acid, and at 25° C. liquid polyolefin resins. According to one or more embodiments, the styrene block copolymer based pressure sensitive adhesive composition comprises at least one at 25° C. liquid polyolefin resin. Suitable at 25° C. liquid polyolefin resins have an average molecular weight ($M_n$) of not more than 15'000 g/mol, preferably not more than 5'000 g/mol, most preferably not more than 2'500 g/mol and/or a pour point determined according to ISO 3016, in the range of −10 to +15° C., in particular from −10 to +10° C. Preferably, the at least one liquid polyolefin resin is present in the styrene block copolymer based pressure sensitive adhesive composition in an amount of 1-30 wt.-%, more preferably 5-25 wt.-%, most preferably 10-25 wt.-%, based on the total weight of the adhesive composition.

According to one or more embodiments, the at least one at 25° C. liquid polyolefin resin is selected from the group consisting of at 25° C. liquid polybutene and polyisobutylene. The term "at 25° C. liquid polybutene" refers in the present document to low molecular weight olefin oligomers comprising isobutylene and/or 1-butene and/or 2-butene.The ratio of the $C_4$-olefin isomers can vary by manufacturer and by grade. When the C4-olefin is exclusively 1-butene, the material is referred to as "poly-n-butene" or "PNB". The term "at 25° C. liquid polyisobutylene" refers in the present document to low molecular weight polyolefins and olefin oligomers of isobutylene. Preferably, the at 25° C. liquid polybutene and polyisobutylene have a number average molecular weight ($M_n$) of less than 10'000 g/mol, preferably less than 5'000 g/mol, even more preferably less than 1'000 g/mol.

Suitable commercially available at 25° C. liquid polybutenes and polyisobutylenes include, for example, Indopol® H-300 and Indopol® H-1200 (from Ineos); Glissopal® V230, Glissopal® V500, and Glissopal® V700 (from BASF); Dynapak® poly 230 (from Univar GmbH, Germany); and Daelim® PB 950 (from Daelim Industrial).

According to one or more embodiments, the adhesive composition is a rubber-based pressure sensitive adhesive composition comprising at least one rubber component.

Suitable rubber components for the rubber-based pressure sensitive adhesive composition include, for example, butyl rubber, halogenated butyl rubber, ethylene-propylene rubber, ethylene-propylene diene monomer rubber, natural rubber, chloroprene rubber, synthetic 1,4-cis-polyisoprene, polybutadiene, isoprene-butadiene copolymer, methyl methacrylate-butadiene copolymer, methyl methacrylate-isoprene copolymer, acrylonitrile-isoprene copolymer, and acrylonitrile-butadiene copolymer, and silicone rubber. According to one or more embodiments, the at least one rubber component is selected from the group consisting of butyl rubber, halogenated butyl rubber, ethylene-propylene rubber, ethylene-propylene diene monomer rubber, natural rubber, chloroprene rubber, synthetic 1,4-cis-polyisoprene, polybutadiene, and isoprene-butadiene copolymer, preferably from the group consisting of butyl rubber, halogenated butyl rubber, natural rubber, and chloroprene rubber.

According to one or more embodiments, the at least one rubber component is present in the rubber-based pressure sensitive adhesive composition in an amount of 5-70 wt.-%, preferably 10-60 wt.-%, more preferably 10-55 wt.-%, even more preferably 15-50 wt.-%, based on the total weight of the adhesive composition.

The rubber-based pressure sensitive adhesive composition preferably further comprises at least one tackifying resin, preferably selected from the group consisting of synthetic resins, natural resins, and chemically modified natural resins. According to one or more embodiments, the at least one tackifying resin is present in the rubber-based pressure sensitive adhesive composition in an amount of 2.5-60 wt.-%, preferably 5-55 wt.-%, more preferably 5-50 wt.-%, even more preferably 10-45 wt.-%, based on the total weight of the adhesive composition.

Suitable tackifying resins to be used in the rubber-based pressure sensitive adhesive composition include, in particular, the petroleum hydrocarbon resins described above as suitable for the styrene block copolymer-based pressure sensitive adhesive compositions. Preferably, the at least one tackifying resin contained in the rubber-based pressure sensitive adhesive composition is a petroleum hydrocarbon resin having a softening point determined by using the Ring and Ball method as defined in DIN EN 1238 standard of at least 75° C., preferably at least 85° C., in particular in the range of 75-180° C., preferably 80 -160° C.

According to one or more embodiments, the rubber-based pressure sensitive adhesive composition further comprises at least one at 25° C. liquid polyolefin resin, preferably selected from the group consisting of at 25° C. liquid polybutene and at 25° C. liquid polyisobutylene, preferably having a number average molecular weight ($M_n$) of less than 10'000 g/mol, preferably less than 5'000 g/mol, even more preferably less than 1'000 g/mol.

According to one or more embodiments, the at least one at 25° C. liquid polyolefin resin is present in the rubber-based pressure sensitive adhesive composition in an amount of 2.5-55 wt.-%, preferably 5-50 wt.-%, more preferably 5-50 wt.-%, even more preferably 10-45 wt.-%, based on the total weight of the adhesive composition.

According to one or more embodiments, the rubber-based pressure sensitive adhesive composition further comprises at least one filler, preferably selected from the group consisting of calcium carbonate, clay, expanded clay, diatomaceous earth, pumice, mica, kaolin, talc, dolomite, xonotlite, perlite, vermiculite, Wollastonite, barite, magnesium carbonate, magnesium silicate, precipitated silica, fumed silica, glass beads, hollow glass spheres, ceramic spheres, bauxite, and zeolites, more preferably from the group consisting of calcium carbonate, clay, expanded clay, diatomaceous earth, pumice, mica, kaolin, talc, dolomite, xonotlite, perlite, vermiculite, Wollastonite, barite, magnesium carbonate, magnesium silicate, precipitated silica, and fumed silica.

According to one or more embodiments, the at least one filler is present in the rubber-based pressure sensitive adhesive composition in an amount of 5-80 wt.-%, preferably 10-75 wt.-%, more preferably 15-70 wt.-%, even more preferably 15-65 wt.-%, based on the total weight of the adhesive composition.

According to one or more embodiments, the adhesive composition is a rubber-based pressure sensitive adhesive composition comprising:

a') 5-70 wt.-%, preferably 10-60 wt.-% of at least one rubber component, preferably selected from the group consisting of butyl rubber, halogenated butyl rubber, ethylene-propylene rubber, ethylene-propylene diene monomer rubber, natural rubber, chloroprene rubber, synthetic 1,4-cis-polyisoprene, polybutadiene, and isoprene-butadiene copolymer, more preferably selected from the group consisting of butyl rubber, halogenated butyl rubber, natural rubber, and chloroprene rubber, b') 2.5-60 wt.-%, preferably 5-55 wt.-% of at least one tackifying resin, preferably a petroleum hydrocarbon resin having a softening point determined by using the Ring and Ball method as defined in DIN EN 1238 standard of at least 75° C., preferably at least 85° C., c') 2.5-55 wt.-%, preferably 5-50 wt.-% of at least one at 25° C. liquid polyolefin resin, preferably selected from the group consisting of at 25° C. liquid polybutene and at 25° C. liquid polyisobutylene, preferably having a number average molecular weight ($M_n$) of less than 10'000 g/mol, preferably less than 5'000 g/mol, and d') 5-80 wt.-%, preferably 10-75 wt.-% at least one filler, preferably selected from the group consisting of calcium carbonate, clay, expanded clay, diatomaceous earth, pumice, mica, kaolin, talc, dolomite, xonotlite, perlite, vermiculite, Wollastonite, barite, magnesium carbonate, magnesium silicate, precipitated silica, fumed silica, glass beads, hollow glass spheres, ceramic spheres, bauxite, and zeolites, more preferably from the group consisting of calcium carbonate, clay, expanded clay, diatomaceous earth, pumice, mica, kaolin, talc, dolomite, xonotlite, perlite, vermiculite, Wollastonite, barite, magnesium carbonate, magnesium silicate, precipitated silica, and fumed silica, all proportions being based on the total weight of the rubber-based pressure sensitive adhesive composition.

The pressure sensitive adhesive composition may further comprise one or more auxiliary additives selected from UV absorbers, UV stabilizers, heat stabilizers, antioxidants, flame retardants, optical brighteners, pigments, dyes, and biocides. The auxiliary additives, if used at all, preferably comprise not more than 20 wt.-%, more preferably not more than 10 wt.-%, most preferably not more than 5 wt.-%, of the total weight of the pressure sensitive adhesive composition.

According to one or more embodiments, the pressure sensitive adhesive composition further comprises at least one electrically conductive filler selected from the group consisting of carbon fibers, steel fibers, carbon black particles, carbon nanotubes, and graphite particles.

If present in the adhesive composition, the at least one electrically conductive filler is preferably distributed throughout the entire volume of the layer of adhesive composition. The term "distributed throughout the entire volume" in understood to mean that the at least one electrically conductive filler, for example carbon fibers, are present in essentially all portions of the layer of adhesive composition but it does not necessarily imply that their distribution is uniform throughout the layer of adhesive composition. It may, however, be preferable that the at least one electrically conductive filler is uniformly distributed throughout the entire volume of the layer of adhesive composition. For a person skilled in the art it is clear that even if the at least one electrically conductive filler is uniformly distributed, there may be regions in the layer of adhesive composition, which have a slightly higher concentration of the at least one electrically conductive filler than other regions and that a 100% uniform distribution is generally not achievable.

Preferably, the at least one conductive filler is present in the pressure sensitive adhesive composition in an amount of 0.5-15.0 wt.-%, preferably 1.0-10.0 wt.-%, based on the total weight of the adhesive composition. It has been found that the electrically conductive filler can be added to the pressure sensitive adhesive composition in the above cited amounts without having significant negative effect on adhering properties of the sealing device, such as adhesive bond strength and thermal stability. On the other hand, the above cited amounts of electrically conductive filler have been found to be sufficient to decrease the resistance of the layer of adhesive composition to a level, which enables detection of leakages in fully adhered roof systems with low voltage methods.

In a low voltage detection method, the exterior surface of a sealing device facing away from the surface of a roof substrate is first wetted with a thin layer of water. Then a low voltage potential difference is created between a conductor placed on the outer surface of the sealing device and another conductor embedded in the layer of adhesive composition. In case of an intact waterproofing layer(s), no current can flow between the conductors due to the high resistance of the waterproofing layer(s). Therefore, a detected current is a clear indication of a breach in the waterproofing layer(s) through which the water has penetrated and reached the layer of adhesive composition. A high voltage leak detection method differs from low voltage detection method in that the measurement is performed on a dry outer surface of the sealing device.

According to one or more embodiments, the adhesive composition is a pressure sensitive adhesive sealant composition comprising:

a") 1.0-30.0 wt.-% of at least one elastomer, b") 10.0-60.0 wt.-% of at least one at 25° C. liquid polyolefin resin, and c") 5.0-60.0 wt.-% of at least one inert mineral filler, all proportions being based on the total weight of the adhesive sealant composition.

The type of the at least one elastomer contained in the pressure sensitive adhesive sealant composition is not particularly restricted. The at least one elastomer may be selected from the group consisting of ethylene-propylene rubber (EPR), butyl rubber, halogenated butyl rubber, ethylene-propylene diene rubber (EP DM), natural rubber, chloroprene rubber, synthetic 1,4-cis-polyisoprene, polybutadiene, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer. Preferably, the at least one elastomer is selected from the group consisting of ethylene-propylene rubber (EPR), butyl rubber, synthetic 1,4-cis-polyisoprene, polybutadiene, styrene-butadiene copolymer, isoprene-butadiene copolymer, styrene-isoprene-butadiene rubber, methyl methacrylate-butadiene copolymer, methyl methacrylate-isoprene copolymer, acrylonitrile-isoprene copolymer, and acrylonitrile-butadiene copolymer.

The at least one elastomer is present in the pressure sensitive adhesive sealant composition in an amount of 1.0-30.0 wt.-%, preferably 5.0-25.0 wt.-%, more preferably 10.0-20.0 wt.-%, based on the total weight of the adhesive sealant composition.

Preferably, the at least one at 25° C. liquid polyolefin resin is selected from the group consisting of at 25° C. liquid polybutene and polyisobutylene having an average molecular weight ($M_n$) of not more than 15'000 g/mol, preferably not more than than 5'000 g/mol, even more preferably not more than 1'000 g/mol. The at least one at 25° C. liquid polyolefin resin is present in the pressure sensitive adhesive sealant composition in an amount of 10.0-60.0 wt.-%, preferably 15.0-50.0 wt.-%, more preferably 30.0-45.0 wt.-%, based on the total weight of the adhesive sealant composition.

The at least one inert mineral filler is preferably selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, calcium hydroxide, calcium aluminates, silica, fumed silica, fused silica, aerogels, glass beads, hollow glass spheres, ceramic spheres, bauxite, comminuted concrete, and zeolites.

The at least one mineral filler is present in the pressure sensitive adhesive sealant composition in an amount of 5.0-60.0 wt.-%, preferably 25.0-55.0 wt.-%, more preferably, 35-45 wt.-%, based on the total weight of the adhesive sealant composition.

The pressure sensitive adhesive sealant composition may further comprise at least one tackifying resin. Preferably, the at least one tackifying resin has a softening point measured by Ring and Ball method according to DIN EN 1238 in the range of 65-200° C., more preferably 75-160° C., most preferably 85-140° C. According to one or more embodiments, the at least one tackifying resin is an aliphatic C5/C9 petroleum hydrocarbon resin.

It may be preferable that the at least one tackifying resin is present in the pressure sensitive adhesive sealant composition in an amount of not more than 20.0 wt.-%, more preferably not more than 15.0 wt.-%, based on the total weight of the pressure sensitive adhesive sealant composition. It may also be preferable that the at least one tackifying resin is present in the pressure sensitive adhesive sealant composition in an amount of 0.5-20.0 wt.-%, more preferably 1.0-15.0 wt.-%, most preferably 1.5-10.0 wt.-%, based on the total weight of the pressure sensitive adhesive sealant composition.

The pressure sensitive adhesive sealant composition may further comprise one or more auxiliary additives selected from UV absorbers, UV stabilizers, heat stabilizers, antioxidants, flame retardants, optical brighteners, pigments, dyes, and biocides. The auxiliary additives, if used at all, preferably comprise not more than 20 wt.-%, more preferably not more than 10 wt.-%, most preferably not more than 5 wt.-%, of the total weight of the adhesive sealant composition.

The layer of pressure sensitive adhesive sealant composition may have a thickness of 0.25-3.5 mm, preferably 0.5-3.0 mm, more preferably 0. 5-2.5 mm, even more preferably 0.75-2.0 mm, most preferably 1.0-2.0 mm. The thickness of the adhesive layer can be determined by using the measurement method as defined in DIN EN 1849-2 standard. According to one or more embodiments, the layer of pressure sensitive adhesive sealant composition has uniform thickness such that the difference between measured thicknesses of the layer of sealant composition at any two points on the surface of the functional layer is not more than 0.15 mm, preferably not more than 0.075 mm, most preferably not more than 0.05 mm.

The sealing device is typically provided in a form of a prefabricated membrane article, which is delivered to the construction site and unwound from rolls to provide sheets having a width of 1-5 m and length of several times the width. However, the sealing device can also be used in the form of strips having a width of typically 1-20 cm, for example so as to seal joints between two adjacent membranes. Moreover, the sealing device can also be provided in the form of planar bodies, which are used for repairing damaged locations in existing adhered roof systems.

The preferences given above for the waterproofing layer, the functional layer, the reinforcement layer, the layer of adhesive composition, and for the at least one thermoplastic polymers P1, P2, and P3 as well as for the at least one solid particulate filler F, apply equally to all aspects of the present invention unless otherwise stated.

Another subject of the present invention is a method for producing a sealing device of the present invention. The method for producing a sealing device is not particularly limited and any conventional technology suitable for producing composite membranes comprising polymer based sheets and films can be used.

The sealing device of the present invention can be produced, for example, by using conventional extruding, calendering, compressing, or casting techniques. Preferably, the method for producing a sealing device of the present invention comprises extruding and/or calendering and/or co-extruding compositions of the waterproofing layer(s) and the functional layer. The "compositions" of the waterproofing layer(s) and functional layer comprise all the constituents needed to form the respective layers. The details of the method for producing a sealing device depend on the embodiment of the sealing device.

Preferably, the method for producing a sealing device of the present invention comprises steps of:

i) Extruding a composition of the functional layer through a first die on a first surface of a reinforcement layer and ii) Extruding a composition of the waterproofing layer through a second die on a second surface of the reinforcement layer, or i) Providing a waterproofing layer having a reinforcement layer fully embedded into the waterproofing layer and ii) Extruding a composition of the functional layer through a die on one of the surfaces of the waterproofing layer, or i) Co-extruding compositions of the waterproofing layer and the functional layer through a common die and ii) Extruding a composition of the second waterproofing layer through a die on the first major surface of the waterproofing layer, or i) Co-extruding compositions of the waterproofing layer, the functional layer, and the second waterproofing layer through a common die.

In an extrusion step, composition of the corresponding layer is first melt-processed in an extruder to produce a homogenized melt, which is then extruded through an extruder die. Suitable extrusion apparatuses comprising at least one extruder and an extruder die are well known to a person skilled in the art. Any conventional extruder, for example, a ram extruder, single screw extruder, or a twin-screw extruder may be used. Preferably, the extruder is a screw extruder, more preferably a twin-screw extruder. The extruder die, preferably a flat die, consists of manifold, approach, and lip regions. In case of a co-extrusion process, an extruder apparatus comprising at least two extruders, preferably twin-screw extruders, and a single manifold or a multi manifold die, can be used.

The extrusion temperature is preferably 80-250° C., more preferably 100-240° C., even more preferably 120-220° C., most preferably 140-200° C. The term "extrusion temperature" refers to the temperature of the extruded composition in the die outlet. Preferably, the extrusion pressure is 20-350 bar, preferably 30-240 bar, more preferably 35-200 bar, most preferably 40-130 bar. The "extrusion pressure" refers to the pressure of the composition at the end of the metering zone just before the composition enters the die inlet.

According to one or more embodiments, the method for producing a sealing device comprises a further step of employing spaced apart calender cooling rolls through which the membrane composite obtained in step ii) or i), in case of one-step co-extrusion process, is drawn. The membrane composite is drawn through the calender cooling rolls in order to ensure that the layers are bonded to each other and/or to control the thickness of the extruded layers, in particular the thickness of the functional layer.

In case the composition of the functional layer contains one or more mineral binders, the amount of water contained in the composition, if present, should be low enough to keep the mineral binders in essentially non-hydrated form during the melt-processing and extrusion/calendering steps. Hydration of the mineral binders during the production process is not desired since it would significantly reduce the flexibility of the functional layer due to the formation of interconnected solid networks of hydrated mineral binders. Flexibility of the functional layer is essential in order to provide sealing devices, which can be stored and transported in form of rolls and which can be easily applied on the surface of the substrate to be waterproofed.

According to one or more preferred embodiments, the amount of water in the composition of the functional layer is not more than 5 wt.-%, preferably not more than 2.5 wt.-%, more preferably not more than 1 wt.-%, most preferably not more than 0.5 wt.-%, based on the total weight of the composition of the functional layer.

According to one or more embodiments, the method for producing a sealing device comprises further steps of:

iii) Heating an adhesive composition to allow the composition to flow and iv) Coating the heated adhesive composition onto the second major surface of the functional layer such that the second major surface is at least partially covered by a layer of adhesive composition.

The adhesive composition may be applied on the second surface of the functional layer by using any conventional means such as by die coating, extrusion coating, roller coating, powder dispersion, or by spray lamination techniques. The temperature to which the adhesive composition is heated in step ii) depends on the embodiment of the sealing device. It may be preferable that the adhesive is heated to a temperature in the range of 50-200° C., such as 75-150° C., in particular 80-130° C.

The adhesive may be applied only on part or on the entire area of the second major surface of the functional layer. In case the same adhesive is used for bonding seams between overlapping parts of adjacent sealing devices, the adhesive may be applied over substantially the entire area of the second major surface of the functional layer. It may be preferable that the adhesive is applied over at least 50%, more preferably at least 70%, most preferably at least 90%, of the area of the second major surface of the functional layer.

Another subject of the present invention is a method for waterproofing a substrate using one or more sealing devices of the present invention.

According to one or more embodiments, the sealing device(s) used in the method for waterproofing a substrate does not comprise pre-applied layer of adhesive composition and the method comprises steps of:

i') Providing a sealing device of the present invention, ii') Applying an adhesive composition on at least portion of a surface of the substrate to form a first adhesive film and on at least portion of the second major surface of the functional layer to form a second adhesive film, iii') Contacting the first and second adhesive films to affect adhesive bonding between the substrate and the sealing device.

The adhesive composition used in these embodiments of the method for waterproofing a substrate is preferably a solvent or water based contact adhesive. Suitable solvent-based contact adhesives are commercially available, for example, under the trade name of Sarnacol® (from Sika).

According to one or more embodiments, the sealing device(s) used in the method for waterproofing a substrate comprises a pre-applied layer of adhesive composition and the method comprises steps of:

i') Providing a sealing device of the present invention, ii') Applying the sealing device on the surface of the substrate to be waterproofed such that the layer of adhesive composition is directly contacted with the surface of the substrate, iii') Pressing sealing device against the surface of the substrate with a pressure sufficient to affect adhesive bonding between the sealing device and the substrate.

Still another subject of the present invention is a roof system comprising:

I) A roof substrate,

II) A sealing device according to the present invention, wherein the sealing device is directly adhered to the surface of the roof substrate with a layer of adhesive.

The substrate on which the sealing device is adhered is preferably selected from the group consisting of an insulation board, a cover board, and an existing roofing membrane.

The roof system comprises a layer of adhesive between the functional layer and the roof substrate. Depending on the embodiment of the sealing device, the adhesive can be a contact adhesive or a pre-applied adhesive, such as a pressure sensitive adhesive or a pressure sensitive hot-melt adhesive.

According to one or more embodiments, the thickness of the layer of adhesive in its cured state is 0.1-3.5 mm, preferably 0.25-3.5 mm, even more preferably 0.25-3.0 mm, most preferably 0.35-2.5 mm. The term "cured state" refers to a state of the adhesive composition after it has been physically and/or chemically cured. The type of curing mechanism depends on the embodiment of the adhesive composition. In case of a pressure sensitive adhesive, the term "cured state" refers to the state after the sealing device has been pressed against the surface of the substrate with a pressure sufficient to affect adhesive bonding between the sealing device and the substrate.

Preferably, at least 50%, preferably at least 75%, most preferably at least 85%, of the entire area of the second major surface of the functional layer is directly adhered to the surface of the roof substrate with the layer of adhesive.

DETAILED DESCRIPTION OF THE DRAWINGS

FIG. 1 shows a cross-section of an embodiment of the sealing device (1) comprising a waterproofing layer (2) having first and second major surfaces, a functional layer (3) having first and second major surfaces, and a reinforcement layer (4) fully embedded into the waterproofing layer (2). In this embodiment, substantially the entire first major surface of the functional layer (3) is directly connected to the second major surface of the waterproofing layer (2).

Figure 2:
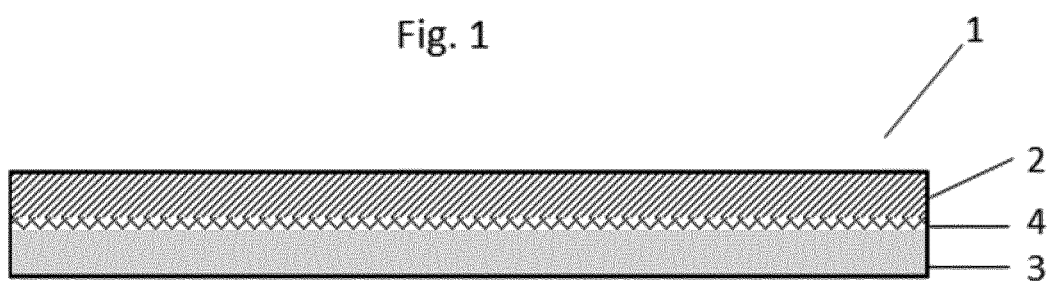
FIG. 2 shows a cross-section of a sealing device (1) comprising a waterproofing layer (2), a functional layer (3), and a reinforcement layer (4) located between the waterproofing layer (2) and the functional layer (3).

FIG. 2 shows cross-section of an embodiment of the sealing device (1) comprising a waterproofing layer (2), a functional layer (3), and a reinforcement layer (4) located between the waterproofing layer (2) and the functional layer (3). In this embodiment, one side of the reinforcement layer (4) is directly connected to the second surface of the waterproofing layer (2) the other side being directly connected to the first surface of the functional layer (3). It is also possible that the reinforcement layer (4) is partially embedded into the waterproofing layer (2) and/or into the functional layer (3).

Figure 3:
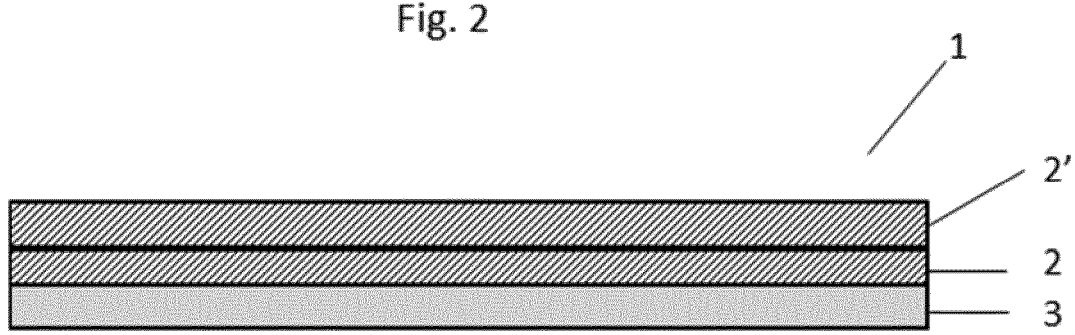
FIG. 3 shows a cross-section of a sealing device (1) comprising a waterproofing layer (2), a functional layer (3), and a second waterproofing layer (2') located on the outward facing side of the waterproofing layer (2) opposite the side or the functional layer (3).

FIG. 3 shows a cross-section of an embodiment of the sealing device (1) comprising a waterproofing layer (2), a functional layer (3), and a second waterproofing layer (2') located on the outward facing side of the waterproofing layer (2) opposite the side or the functional layer (3). The second waterproofing layer (2') may, for example, be attached to the first major surface of the waterproofing layer (2) by an adhesive or by thermal lamination/welding. In this embodiment, substantially the entire first major surface of the functional layer (3) is directly connected to the second major surface of the waterproofing layer (2).

Figure 4:
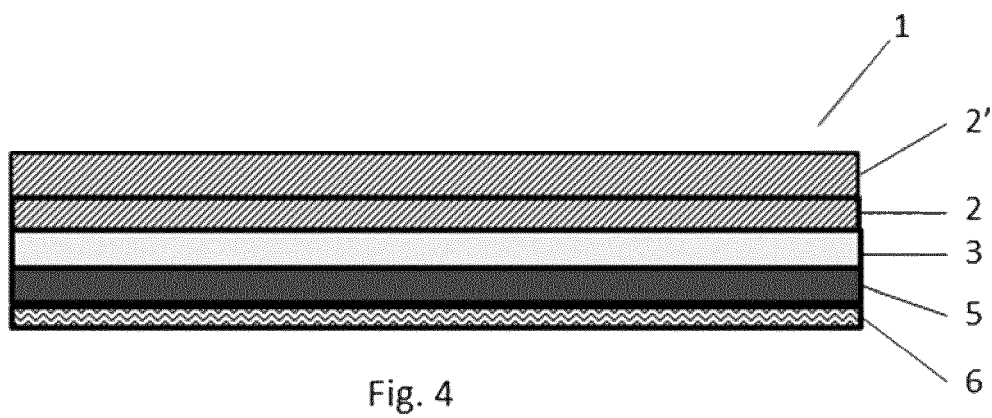
FIG. 4 shows a cross-section of a sealing device (1) comprising a waterproofing layer (2), a functional layer (3), a second waterproofing layer (2') located on the outward facing side of the waterproofing layer (2) opposite the side or the functional layer (3), a layer of adhesive composition (5) coated on the second major surface of the functional layer (3) and a release liner (6) covering the outer surface of the layer of adhesive composition (5) facing away from the second major surface of the functional layer (3).

FIG. 4 shows a cross-section of an embodiment of the sealing device (1) comprising a waterproofing layer (2), a functional layer (3), a second waterproofing layer (2') located on the outward facing side of the waterproofing layer (2) opposite the side or the functional layer (3), a layer of adhesive composition (5) coated on the second major surface of the functional layer (3) and a release liner (6) covering the outer surface of the layer of adhesive composition (5) facing away from the second major surface of the functional layer (3). In this embodiment, substantially the entire first major surface of the functional layer (3) is directly connected to the second major surface of the waterproofing layer (2) and the layer of adhesive composition is coated on substantially the entire second major surface of the functional layer (3). The release liner (6) covers substantially the entire outer surface of the layer of adhesive composition (5).

Figure 5:
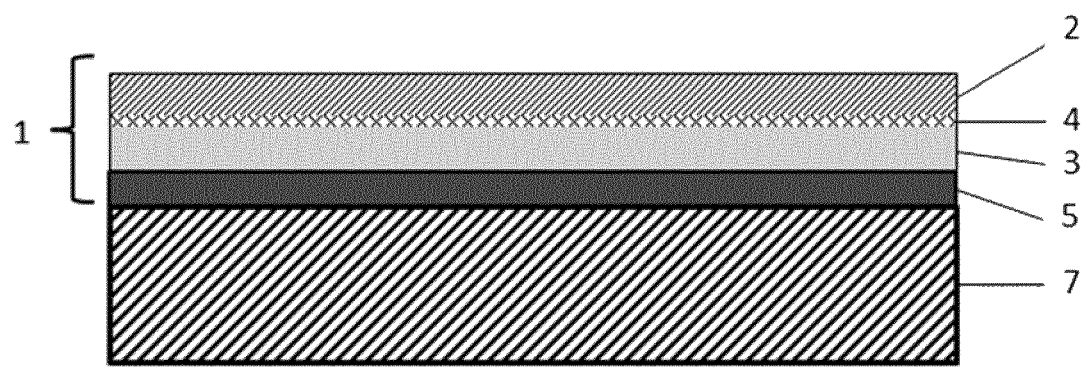
FIG. 5 shows a cross-section of a roof system comprising a roof substrate (7) and a sealing device (1) of FIG. 2 directly adhered to the surface of the substrate with the layer of adhesive composition (5).

FIG. 5 shows a cross-section of an embodiment of the roof system comprising a roof substrate (7) and a sealing device (1) of FIG. 2 directly adhered to the surface of the substrate with the layer of adhesive composition (5). In this embodiment, substantially the entire area of the second major surface of the functional layer (3) is directly adhered to the surface of the roof substrate (2) with the layer of adhesive (5).

The invention claimed is:

1. A sealing device comprising a waterproofing layer having first and second major surfaces and a functional layer having first and second major surfaces, the functional layer comprising:

a) 10-70 wt.-% of at least one thermoplastic polymer P2 and b) 30-90 wt.-% of at least one solid particulate filler F, the proportions being based on the total weight of the functional layer, wherein the functional layer is a heterogeneous mixture of at least two discrete phases, at least one being a continuous thermoplastic polymer phase comprising component a) and at least one being a discontinuous solid filler phase comprising component b), the at least one solid particulate filler F is present as individual particles or as aggregates of one or more particles, the particles being at least partially surrounded by the continuous thermoplastic polymer phase, and the particles remaining as a discrete discontinuous solid phase interspersed among the continuous thermoplastic phase, the functional layer and the waterproofing layer are directly or indirectly connected over at least part of their opposing major surfaces and wherein the sealing device further comprises a reinforcement layer fully embedded into the waterproofing layer or located between the waterproofing layer and the functional layer and/or a second waterproofing layer located on the outward facing side of the waterproofing layer opposite the side of the functional layer.

2. The sealing device according to claim 1, wherein the particles of the at least one solid particulate filler F are distributed throughout the entire volume of the functional layer.

3. The sealing device according to claim 1, wherein the waterproofing layer comprises at least one thermoplastic polymer P1, which is present in the waterproofing layer in an amount of at least 80 wt.-%, based on the total weight of the waterproofing layer.

4. The sealing device according to claim 1, wherein the reinforcement layer is in the form of a reinforcing scrim or a reinforcing fiber material.

5. The sealing device according to claim 1, wherein the at least one thermoplastic polymer P2 is selected from the group consisting of ethylene-vinyl acetate copolymer (EVA), ethylene-acrylic ester copolymers, ethylene-α-olefin co-polymers, ethylene-propylene co-polymers, propylene-α-olefin co-polymers, propylene-ethylene copolymers, polypropylene (PP), polyethylene (PE), polyvinylchloride (PVC), polyethylene terephthalate (PET), polystyrene (PS), polyamides (PA), chlorosulfonated polyethylene (CSPE), ethylene propylene diene rubber (EPDM), and polyisobutylene (PIB) and/or the at least one solid particulate filler F is selected from the group consisting of inert mineral fillers and mineral binders.

6. The sealing device according to claim 1, further comprising a layer of adhesive composition coated on and at least partially covering the second major surface of the functional layer.

7. The sealing device according to claim 6 further comprising a release liner at least partially covering the outer surface of the layer of adhesive composition facing away from the second major surface of the functional layer.

8. The sealing device according to claim 6, wherein the adhesive composition is a pressure sensitive adhesive (PSA) composition.

9. The sealing device according to claim 6, wherein the adhesive composition is a pressure sensitive adhesive sealant composition comprising:
a") 1.0-30.0 wt.-% of at least one elastomer,
b") 10.0-60.0 wt.-% of at least one at 25° C. liquid polyolefin resin, and
c") 5.0-60.0 wt.-% of at least one inert mineral filler, all proportions being based on the total weight of the adhesive sealant composition.

10. The sealing device according to claim 9, wherein the at least one elastomer is selected from the group consisting of ethylene-propylene rubber, butyl rubber, halogenated butyl rubber, ethylene-propylene diene rubber (EPDM), natural rubber, chloroprene rubber, synthetic 1,4-cis-polyisoprene, polybutadiene, styrene-butadiene copolymer, isoprene-butadiene copolymer, styrene-isoprene-butadiene rubber, methylisoprene methacrylate-butadiene copolymer, methyl methacrylate-isoprene copolymer, acrylonitrile-copolymer, and acrylonitrile-butadiene copolymer and/or the at least one at 25° C. liquid polyolefin resin is selected from the group consisting of at 25° C. liquid polybutene and at 25° C. liquid polyisobutylene (PIB).

11. The sealing device according to claim 9, wherein layer of adhesive composition has a thickness of 0.25-3.5 mm.

12. A method for waterproofing a substrate comprising steps of:
i') providing a sealing device according to claim 6,
ii') applying the sealing device on a surface of a substrate to be waterproofed such that the layer of adhesive composition is directly contacted with the surface of the substrate,
iii') pressing sealing device against the surface of the substrate with a pressure sufficient to affect adhesive bonding between the sealing device and the substrate.

13. A method for producing a sealing device according to claim 1, comprising steps of:
i) providing a waterproofing layer having a reinforcement layer fully embedded into the waterproofing layer and
ii) extruding a composition of the functional layer through a die on one of the surfaces of the waterproofing layer, or
i) extruding a composition of the functional layer through a first die on a first surface of a reinforcement layer and
ii) extruding a composition of the waterproofing layer through a second die on a second surface of the reinforcement layer, or
i) co-extruding compositions of the waterproofing layer and the functional layer through a common die and
ii) extruding a composition of the second waterproofing layer through a die on the first major surface of the waterproofing layer, or
i) co-extruding compositions of the waterproofing layer, the functional layer, and the second waterproofing layer through a common die.

14. The method for producing a sealing device according to claim 13 comprising further steps of:
iii) heating an adhesive composition to allow the composition to flow, and
iv) coating the heated adhesive composition onto the second major surface of the functional layer such that the second major surface is at least partially covered by a layer of adhesive composition.

15. A method for waterproofing a substrate using one or more sealing devices according to claim 1.

16. The method for waterproofing a substrate according to claim 15 comprising steps of:
i') providing a sealing device
comprising a waterproofing layer having first and second major surfaces and a functional layer having first and second major surfaces and comprising:
a) 10-70 wt.-% of at least one thermoplastic polymer P2 and
b) 30-90 wt.-% of at least one solid particulate filler F, the proportions being based on the total weight of the functional layer, wherein
the functional layer and the waterproofing layer are directly or indirectly connected over at least part of their opposing major surfaces and wherein the sealing device further comprises a reinforcement layer fully embedded into the waterproofing layer or located between the waterproofing layer and the functional layer and/or a second waterproofing layer located on the outward facing side of the waterproofing layer opposite the side of the functional layer;
ii') applying an adhesive composition on at least portion of a surface of the substrate to form a first adhesive film and on at least portion of the second major surface of the functional layer to form a second adhesive film,
iii') contacting the first and second adhesive films to affect adhesive bonding between the substrate and the sealing device.

17. The method for waterproofing a substrate according to claim 16, wherein the adhesive composition is a solvent or water based contact adhesive.

18. A roof system comprising:
  I) a roof substrate,
  II) a sealing device according to claim 1, wherein the sealing device is directly adhered to the surface of the roof substrate with a layer of adhesive.

19. The sealing device according to claim 1, wherein the particles of the at least one solid particulate filler F do not include particles that hydrate in the presence of water.

\* \* \* \* \*